United States Patent [19]

Kato et al.

[11] Patent Number: 5,030,987

[45] Date of Patent: Jul. 9, 1991

[54] IMAGE FORMING APPARATUS

[75] Inventors: Tomokazu Kato; Syuzi Maruta; Kadotaro Nishimori; Masazumi Ito, all of Osaka, Japan

[73] Assignee: Minolta Camera Kabushiki Kaisha, Osaka, Japan

[21] Appl. No.: 487,272

[22] Filed: Mar. 2, 1990

[30] Foreign Application Priority Data

Mar. 3, 1989 [JP] Japan ................................ 1-051079

[51] Int. Cl.[5] ........................ G03B 27/32; G03B 27/52

[52] U.S. Cl. ...................................... 355/24; 355/206; 355/209; 355/316; 355/318; 355/319; 355/320

[58] Field of Search ................ 355/24, 206, 209, 316, 355/319, 320, 318

[56] References Cited

U.S. PATENT DOCUMENTS 4,639,114 1/1987 Ide et al. .

4,688,929 8/1987 Taniguchi et al. .

OTHER PUBLICATIONS

IBM Technical Disclosure Bulletin, vol. 21, No. 9 Feb., 1979, pp. 3531-3532.

*Primary Examiner*—Monroe H. Hayes

*Attorney, Agent, or Firm*—Burns, Doane, Swecker & Mathis

[57] ABSTRACT

An image forming apparatus provided with a plurality of copying modes and a plurality of copy paper transport passages to be selected according to the copying modes, which includes a device for selecting a desired copying mode from the plurality of copying modes, a device for setting a copy paper transport passage to be used for the selected copying mode, from the plurality of paper transport passages, a detecting device disposed in the plurality of copy paper transport passages for detecting trouble during transport of copy paper, a display for indicating a position in the copy paper transport passage where the trouble for transporting the copy paper has occurred, with the display including a plurality of display elements, and a control device for actuating some of the plurality of display elements for indicating the position where the copy paper transport trouble has occurred and the set copy paper transport passage, in response to the detection of the copy paper transport trouble.

11 Claims, 15 Drawing Sheets

IMAGE FORMING APPARATUS

BACKGROUND OF THE INVENTION

The present invention generally relates to an image forming apparatus and more particularly, to a copying apparatus capable of displaying a position or spot where trouble has taken place and also, a copy paper passing or transport passage (referred to as a copy paper transport passage hereinafter) subjected to the trouble upon occurrence of the trouble such as paper jamming or the like.

Conventionally, for indicating the state of troubles, there have been proposed image forming apparatuses e.g. copying apparatuses of the types as follows.

(1) A copying apparatus so arranged that, upon occurrence of trouble such as jamming of the copy paper sheet being transported, the position at which the trouble has taken place is indicated by lighting on a display portion which shows an outline of the copy paper transport passage.

There is also proposed a copying apparatus so arranged that in the case where the trouble as described above takes place in a mode to effect copying of a plurality of copy paper sheets with respect to the same original document (referred to as a multi-copy mode), all positions with a possibility of presence of remaining copy paper sheets (i.e. all of the copy paper transport passages) are displayed on the display portion in the similar manner as in the trouble position through illumination. The above arrangement is employed, since there is a possibility that the copy paper sheets may remain in positions other than the position subjected to the trouble.

(2) Moreover, there has also been conventionally proposed a copying apparatus which is arranged to select different copy paper transport passages for use according to the copying modes.

By way of example, in a duplex or both side copying mode (i.e. a copying mode in which, after having been formed with a copied image on a first face, the copy paper sheet is once accommodated in an intermediate tray without being discharged outside the copying apparatus, and is inverted in its front and reverse faces so as to be again fed to an image forming section, thereby to be formed with another copied image on a second face of the same copy paper sheet), the copy paper transport passages to be selected (i.e. the transport passages to be used) are respectively different between the mode for copying on the first face side (the first face mode) and the mode for copying on the second face side (the second face mode).

Otherwise, even in (a one side copying mode a copying mode arranged to discharge the copy paper sheet out of the copying apparatus after forming a copied image on its first face), with respect to a copying apparatus having a plurality of paper feeding ports (e.g. an upper paper feeding port, a lower paper feeding port, and a manual paper inserting port, etc.), the copy paper transport passages may be respectively different depending on which of the paper feeding ports is used for the paper feeding.

In the copying apparatus as referred to above which is arranged to display position of the trouble such as the paper jamming and the like, and also, all positions with a possibility of presence of remaining copy paper sheets, such "all positions" mean all of the copy paper transport passages within the copying apparatus as described earlier, and these two kinds of positions are displayed without particular distinguishment therebetween.

Therefore, there is such a disadvantage that an operator can not distinguish the actual trouble position and the positions with the possibility of presence of the remaining copy paper sheet, and in spite of the fact that any copy paper sheet does not necessarily remain at such latter positions, the operator undesirably continues to search for the remaining copy paper sheet. Moreover, since all of the copy paper transport passages are displayed, the operator has to check even the positions where there is no possibility of presence of remaining copy paper sheets.

SUMMARY OF THE INVENTION

Accordingly, an essential object of the present invention is to provide an image forming apparatus which is capable of clearly indicating a position where the remaining copy paper sheet is present without fail, positions with a possibility of presence of remaining copy paper sheets, and also, positions without any possibility of presence of remaining copy paper sheets when such copy paper sheet is to be removed during occurrence of any trouble in the passing of copy paper sheets.

Another object of the present invention is to provide an image forming apparatus of the above described type which is simple in construction and stable in functioning at high reliability.

In accomplishing these and other objects, according to one preferred embodiment of the present invention, there is provided an image forming apparatus provided with a plurality of copying modes and a plurality of copy paper transport passages to be selected according to the copying modes, which comprises means for selecting a desired copying mode from said plurality of copying modes; means for setting a copy paper transport passage to be used for the selected copying mode, from said plurality of paper transport passages; a detecting means disposed in said plurality of copy paper transport passages for detecting trouble during transport of copy paper; a display means for indicating a position in the copy paper transport passage where the trouble for transporting the copy paper has occurred, with said display means including a plurality of display elements; and a control means for actuating some of said plurality of display elements for indicating the position where the copy paper transport trouble has occurred and said set copy paper transport passage, in response to the detection of said copy paper transport trouble. By the arrangement according to the present invention as described above, the operator can clearly identify the position where the copy paper sheet is actually present, the positions with a possibility of presence of the remaining copy paper sheet, and the positions without any possibility of presence of the remaining copy paper sheet.

Accordingly, labor in search of the copy paper sheet giving rise to the trouble may be advantageously omitted.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
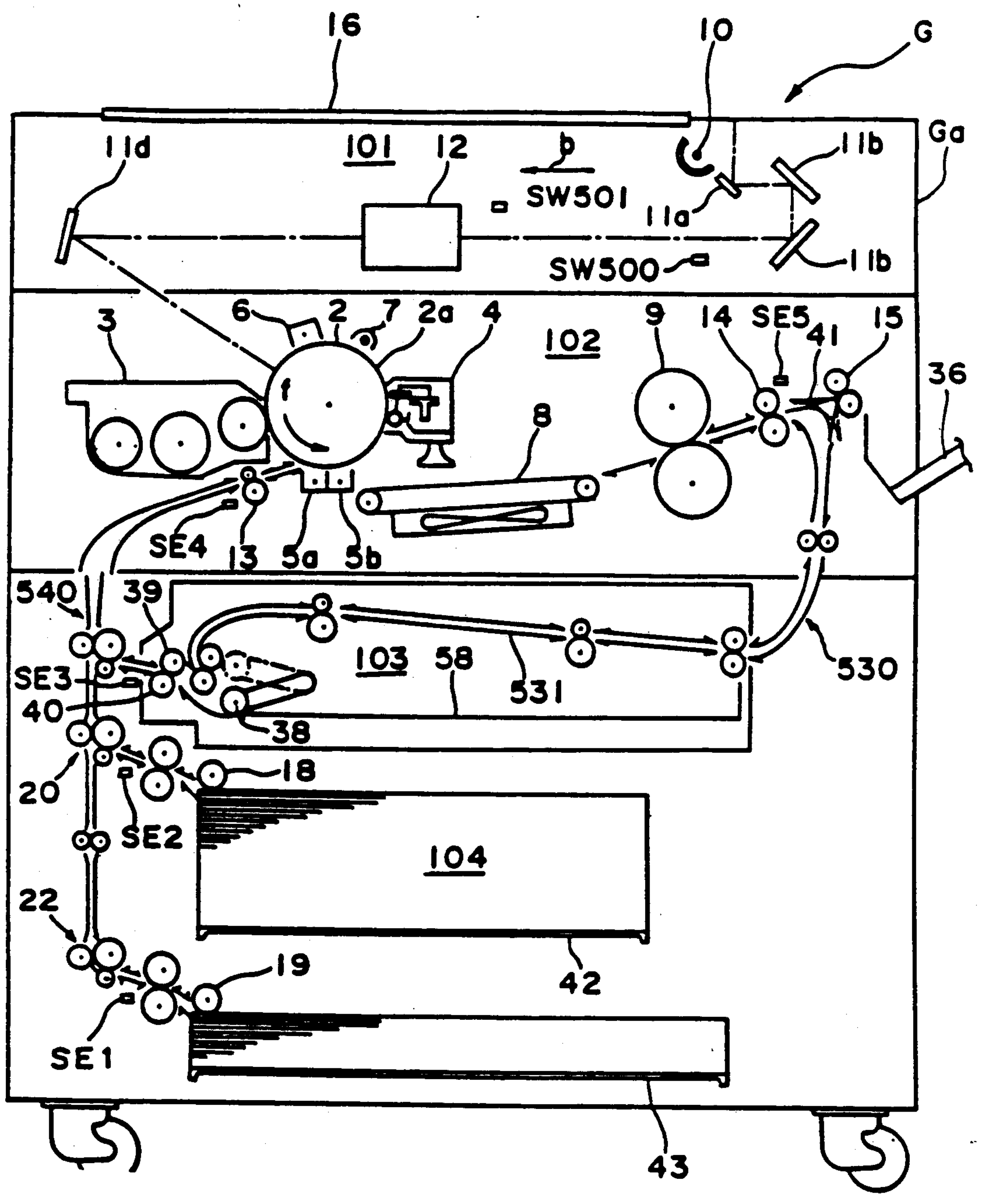
FIG. 1 is a schematic side sectional view of an image forming apparatus in the form of an electrophotographic copying apparatus according to one preferred embodiment of the present invention.

Before the description of the present invention proceeds, it is to be noted that like parts are designated by like reference numerals throughout the accompanying drawings.

Referring now to the drawings, there is shown in FIG. 1, an image forming apparatus in the form of an electrophotographic copying apparatus G according to one preferred embodiment of the present invention, which generally includes an optical system 101 provided at an upper stage, an image forming section 102 disposed at a middle stage, a paper re-feeding unit 103 arranged at a lower stage, and a paper feeding unit 104 provided at the lower-most stage in an apparatus housing Ga as illustrated.

At predetermined positions of copy paper transport passages for the copying apparatus G, there are disposed sensors SE1 to SE5 for detecting passing of copy paper sheets therethrough.

The sensor SE1 is to detect copy paper sheets fed from a lower stage paper feeding tray 43, and the sensor SE2 is the sensor for detecting copy paper sheets fed from an upper stage paper feeding tray 42. Meanwhile, the sensor SE3 is intended to detect copy paper sheets from a re-feeding tray 58.

The sensor SE4 is intended to detect the copy paper sheet in a position immediately before a set of timing rollers 13. The sensor SE5 is adapted to detect the copy paper sheet in a position immediately before a change-over lever 41.

Optical system 101

The optical system 101 includes an exposure lamp 10, reflecting mirrors 11*a*, 11*b* and 11*c*, a lens assembly 12, and another reflecting mirror 11*d*, and is arranged to illuminate for scanning, an image of an original document (not particularly shown) placed on a transparent original document platform 16 disposed at the uppermost portion of the apparatus housing Ga, thereby to direct a reflected light image from the original document, onto a photosensitive surface 2*a* of a photoreceptor drum 2 for the image forming section 102 so as to form an electrostatic latent image of the original document thereon.

The exposure lamp 10 and the reflecting mirror 11*a* are integrally mounted on a first movable member (not shown), and is arranged to be displaced below the original document platform 16 in a direction indicated by an arrow b at a speed represented by V/N (V represents circumferential speed of the photoreceptor drum 2, and N denotes copying magnification) during exposure and scanning of the original document.

Meanwhile, the reflecting mirrors 11*b* and 11*c* are integrally mounted on a second movable member (not shown), and is similarly arranged to move at a speed of V/2N.

It is to be noted here that the above displacement is effected by a scanner motor (not shown), and positional adjustment of the lens assembly 12, and adjustments of the position and angle of the reflecting mirror 11*d* are effected by a lens motor (not shown) based on the copying magnifications.

In the optical system 101, there are also provided a sensor SW 501 for detecting that the scanning has reached a leading edge of the image, and another sensor SW 500 for detecting that the scanning has arrived at a returning starting position.

Image forming section 102

The image forming section 102 executes the image formation based on the so-called electro-photographic process, and mainly includes the photoreceptor drum 2 rotatably provided for rotation in the direction indicated by an arrow f.

Around the photoreceptor drum 2, there are sequentially disposed an eraser lamp 7 for erasing electrical charge remaining on the photosensitive surface 2*a* of the drum 2, a corona charger 6 for uniformly charging the photosensitive surface 2*a*, a developing unit 3 for developing the electrostatic latent image formed on the photosensitive surface 2*a* into a visible toner image, a transfer charger 5*a* for electrically attracting the toner image thus formed on the surface 2*a*, onto the surface of a copy paper sheet, a separating charger 5*b* for separating the copy paper sheet from the photosensitive surface 2*a*, and a cleaning device 4 for removing toner remaining on the surface 2*a* of the photoreceptor drum 2.

The copy paper sheet fed from the paper feeding unit 104 or the paper re-feeding unit 103 is once stopped at the set of the timing rollers 13, and after a predetermined timing taken for synchronization with the leading edge of the image, is fed between the surface 2*a* of the photoreceptor drum 2 and the transfer charger 5*a* so as to be transferred with the toner image as referred to earlier. Thereafter, the copy paper sheet thus treated is transported to a fixing device 9 by a transport belt 8 for fixing of the image thereon, and is further guided through a set of rollers 14 onto an upper surface of the change-over lever 41, and then, discharged onto a paper discharge tray 36 outside the apparatus housing Ga through another set of rollers 15.

It is to be noted here that, upon completion of the copying onto the first surface in the duplex or both side copying mode, or in the composite copying mode, the copy paper sheet is guided from the set of rollers 14 to the under surface of the change-lever 41, and is transported to the paper re-feeding tray 58 through a copy paper transport passage 530, (and a copy paper transport passage 531 during the duplex copying).

Paper re-feeding unit 103

The paper re-feeding unit 103 is used for the composite copying (i.e. the copying in which a composite image is formed on the same surface of the copy paper sheet by the image forming process in two times), and also, for the duplex or both side copying (i.e. the copying in which image formation is effected respectively on the first and the second surfaces of the copy paper sheet by the image forming process in two times).

The copy paper sheet formed with the image on its first surface is once accommodated in the paper re-feeding tray 58 through the copy paper transport passage 530 during the composite copying, and through copy paper transport passages 530 and 531 during the duplex copying. Thus, the copy paper sheet is accommodated in the tray 58, with its first surface directed downward during the composite copying, and with its first surface directed upward during the duplex copying respectively.

Thereafter, the copy paper sheet is pulled out of the tray 58 by a paper re-feeding roller 38 at a predetermined timing, and reaches the set of timing rollers 13 through a copy paper transport passage 540 from between a set of rollers 39 and 40 so as to be again subjected to the image forming process referred to earlier.

Paper feeding unit 104

The paper feeding unit 104 includes the upper stage paper feeding tray 42 and lower stage paper feeding tray 43 respectively for accommodating copy paper sheets of different sizes. Each of the copy paper sheets accommodated in the tray 42 or 43 is pulled out by a paper feeding roller 18 or a paper feeding roller 19, and passes through the copy paper transport passage 540 via an automatic paper feeding mechanism from a set of rollers 20 or 22 so as to reach the set of timing rollers 13, and is, thereafter, subjected to the image forming process referred to earlier.

Control panel, etc.

Figure 2:
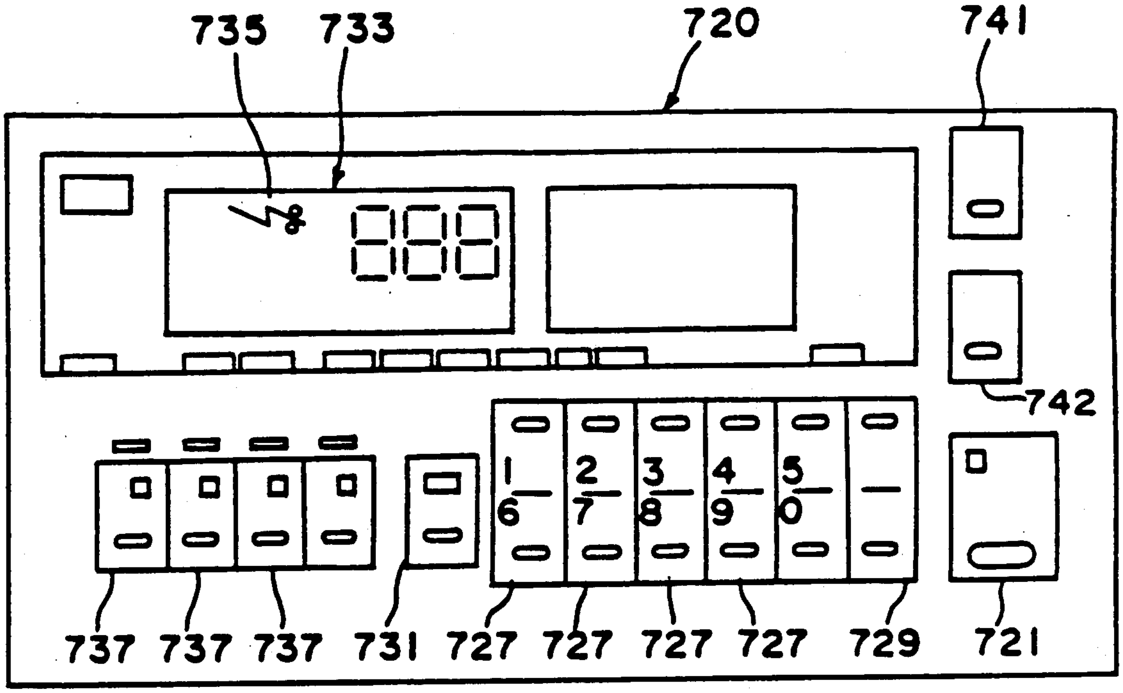
FIG. 2 is a top plan view showing on an enlarged scale, a control panel for the copying apparatus of FIG. 1.
Figure 3:
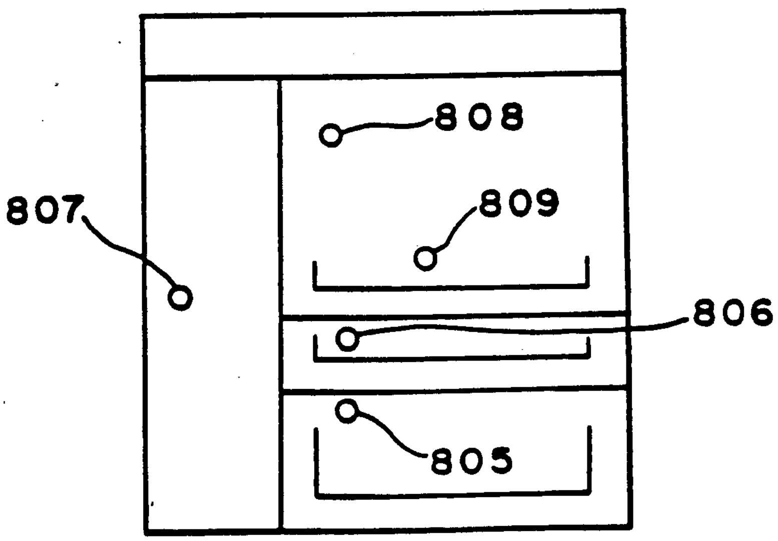
FIG. 3 is a schematic diagram showing a trouble display section for the copying apparatus of FIG. 1.

Reference is made to FIG. 2 showing a control panel for the copying apparatus as described so far, and also to FIG. 3 showing a paper passing or transport jam monitor display for indicating trouble occurring positions in the copy paper transport passages, etc. It is to be noted here that the paper transport jam monitor display may be disposed either in the apparatus housing Ga or on the control panel of the copying apparatus G.

On the control panel 720 shown in FIG. 2, there are arranged a paper feeding port change-over key 742 for the change-over between the upper stage paper feeding tray 42 and the lower stage paper feeding tray 43, and duplex mode key 741 for instructing the setting/releasing of the duplex copying mode, a group of ten keys 727 for inputting numerical values from 0 to 9, a copy start key 721 for instructing starting of the copying function, a clear/stop key 729 for instructing clearing of set numbers and suspension of multi-copy, a group of magnification selecting keys 737 for selecting the copying magnification preliminarily set in a fixed manner, a JAM reset key 731 for instructing resetting of the jamming state after treatment of the paper jamming, a JAM display LED 735 for displaying occurrence of jamming, and a display section 733 in which various display elements for indicating the state of the copying apparatus such as said JAM display LED 735, a PAPER EMPTY display LED, and a TONER EMPTY display LED (not shown), etc. are disposed.

Meanwhile, on the jam monitor display shown in FIG. 3, there are disposed a trouble display LED 806 for displaying the trouble at the upper stage paper feeding port, a trouble display LED 805 for displaying the trouble at the lower stage paper feeding port, a trouble display LED 809 for displaying the trouble at the duplex paper feeding port, a trouble display LED 807 for indicating the trouble at the transport section, and another trouble display LED 808 for displaying the trouble at the discharge section. More specifically, on the paper transport jam monitor display of FIG. 3, the display elements for the trouble display LED's 805,806,807,808 and 809 are arranged to form or represent the copy paper transport passages for the copying apparatus on the whole as they are for quick reference by the operator. In other words, the positional relation of the display elements is displayed also to show the positional relation of the display elements with respect to the cop paper transport passages of the copying apparatus Control circuit FIG. 4 shows a general construction of a control circuit for the copying apparatus as described so far, which is mainly constituted by central processing unit (referred to as CPU hereinafter) 201 for the control purpose in a manner as described hereinafter.

To the CPU 201 for control, there are applied key input signals from the group of key switches of the control panel 720 (e.g. duplex mode keys 741, paper feeding port change-over key 742, etc.), detection signals from the group of sensors disposed at various portions of the copying apparatus for detecting state of operation thereof (e.g. the sensors SE1 to SE5, SW500, SW501, etc.), and signals from other CPU (not shown), etc., while, from said CPU 201, driving signals for the group of display elements on the control panel 720, driving signals for the paper passing jam monitor display, and also, driving signals for the group of various functioning portions within the copying apparatus (e.g. the duplex change-over clutch, duplex paper feeding clutch, upper stage paper feeding clutch, lower stage paper feeding clutch, main motor, etc.) are outputted.

Figure 4:
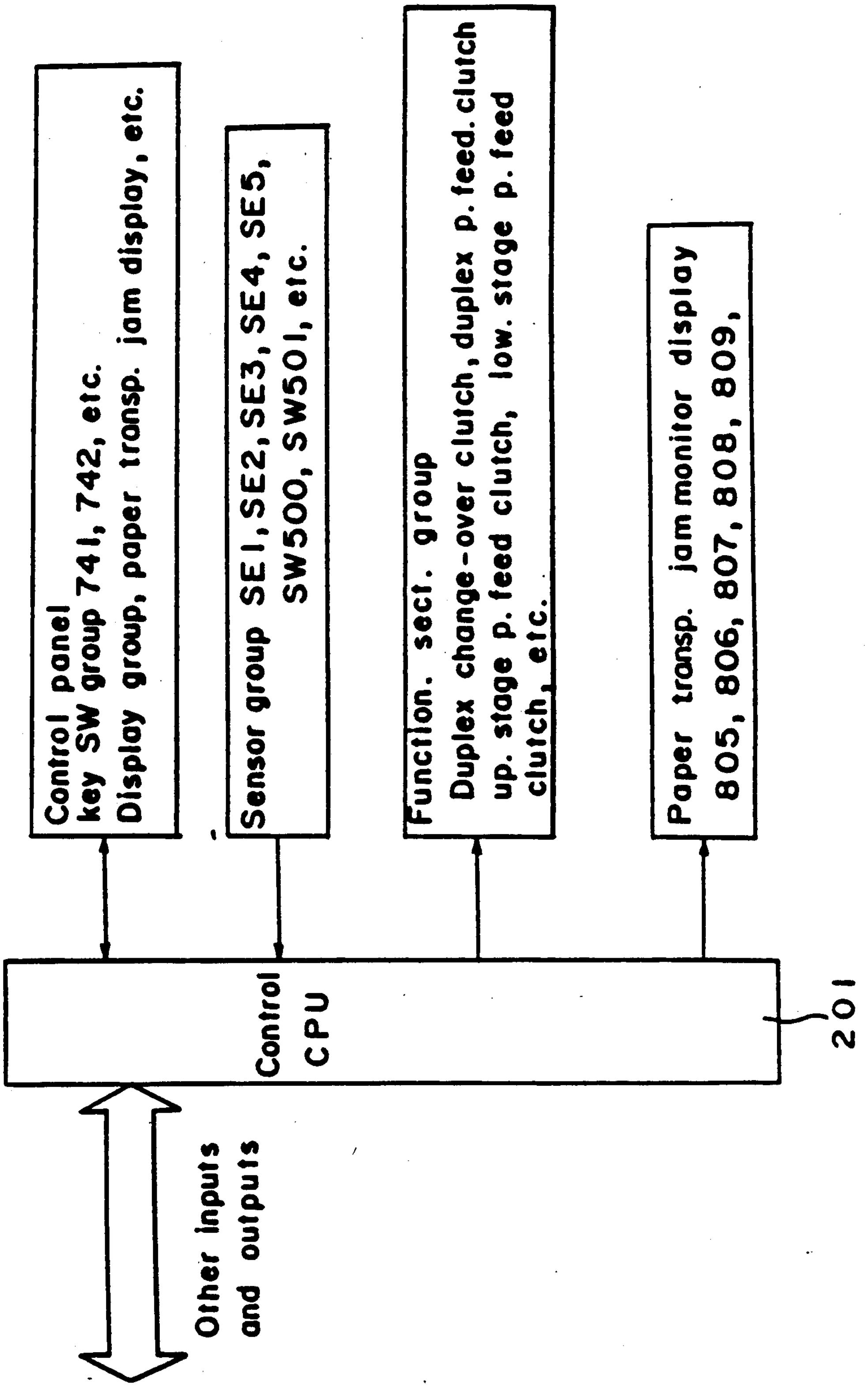
FIG. 4 is a block diagram showing general construction of a control circuit for the copying apparatus of FIG. 1.

In FIG. 4, input and output signals not directly associated with the present embodiment ar collectively shown as "other inputs and outputs".

Description on the processing at the CPU

Subsequently, functioning of the copying apparatus according to the present invention will be described based on the processing at the CPU 201 for the control.

It is to be noted here that, in the following description, "ON edge" means the change of state when the state of signal is varied from "OFF" to "ON".

A General description

Figure 5:
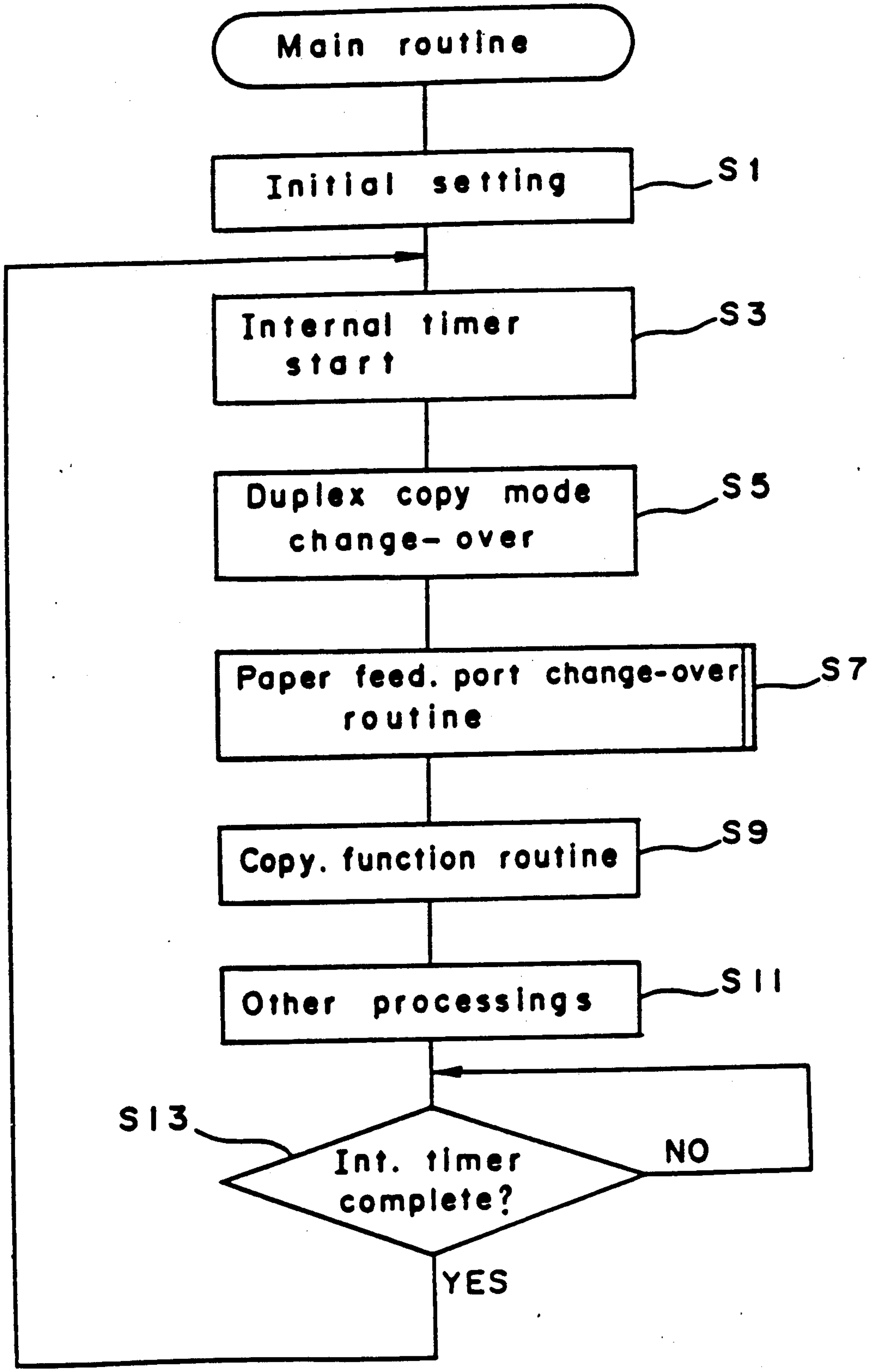
FIG. 5 is a flow-chart showing a main routine for the processing at a central processing unit of the control circuit of FIG. 4.

In a flow-chart of FIG. 5 showing a main routine of processing at the CPU 201, said CPU 201 starts the processing, for example, by turning on a main switch, and first, sets registers and flags, etc. to the initial state (Step S1).

Subsequently, the CPU 201 sets the internal timer for specifying the time for one routine (Step S3), and executes respective processings for Steps S5 to S11. Then, after waiting for the completion of said internal timer at Step S13, the procedure returns to Step S3 to repeat the processing.

(1) Duplex copy mode change-over (Step S5)

According to the input of the duplex mode key 741, setting or releasing of the duplex copy mode is controlled. The processing therefor will be described in detail later.

(2) Paper feeding port change-over (Step S7)

According to the input of the paper feeding port change-over key 742, change-over between the upper stage paper feeding tray 42 and the lower stage paper feeding tray 43 is to be controlled. The processing therefor will be described in detail later.

(3) Copy function (Step S9)

This is the routine for controlling the copy function. It is to be noted that the paper transport jam within the copying apparatus is watched by this routine, and upon occurrence of jamming, the position where the jamming takes place and the paper transport passage being used is respectively displayed through distinction. Detailed processing therefor will be described later.

(4) Other processings (Step S11)

In this step, other processings such as other key inputs, display processings, temperature control, communication with other CPU, etc. are to be controlled. Since such processings are conventional, detailed description thereof is abbreviated for brevity of explanation.

Figure 6:
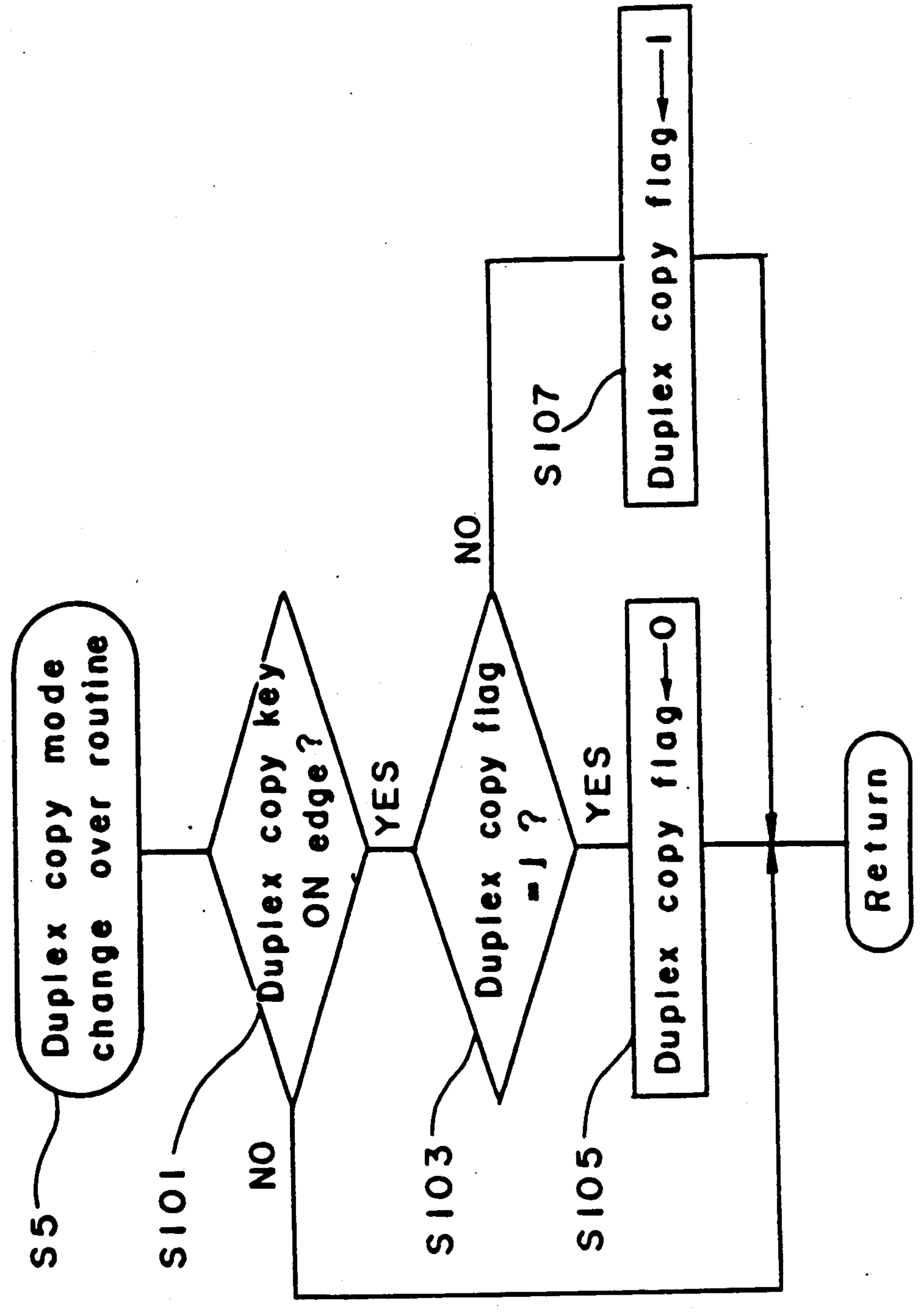
FIG. 6 is a flow-chart showing the processing at Step S5 (duplex copy mode change-over routine) in FIG. 5.

B Explanation of respective sub-routines (1) Duplex copy mode change-over routine FIG. 6 is a flow-chart showing the processing at Step S5 referred to earlier.

In this sub-routine step, duplex copy flag is inverted corresponding to the detection of ON edge of the duplex mode key 741 (Step S101; YES).

In other words, when the duplex copy flag is 1 (Step S103; YES), the duplex copy flag is reset to 0 (Step S105), while in the case where the duplex copy flag is 0 (Step S103; NO), the duplex copy flag is set to 1 (Step S 107).

As described above, according to the ON edge of the duplex mode key 741, setting or releasing of the duplex copy mode is executed.

(2) Paper feeding port change-over routine

Figure 7:
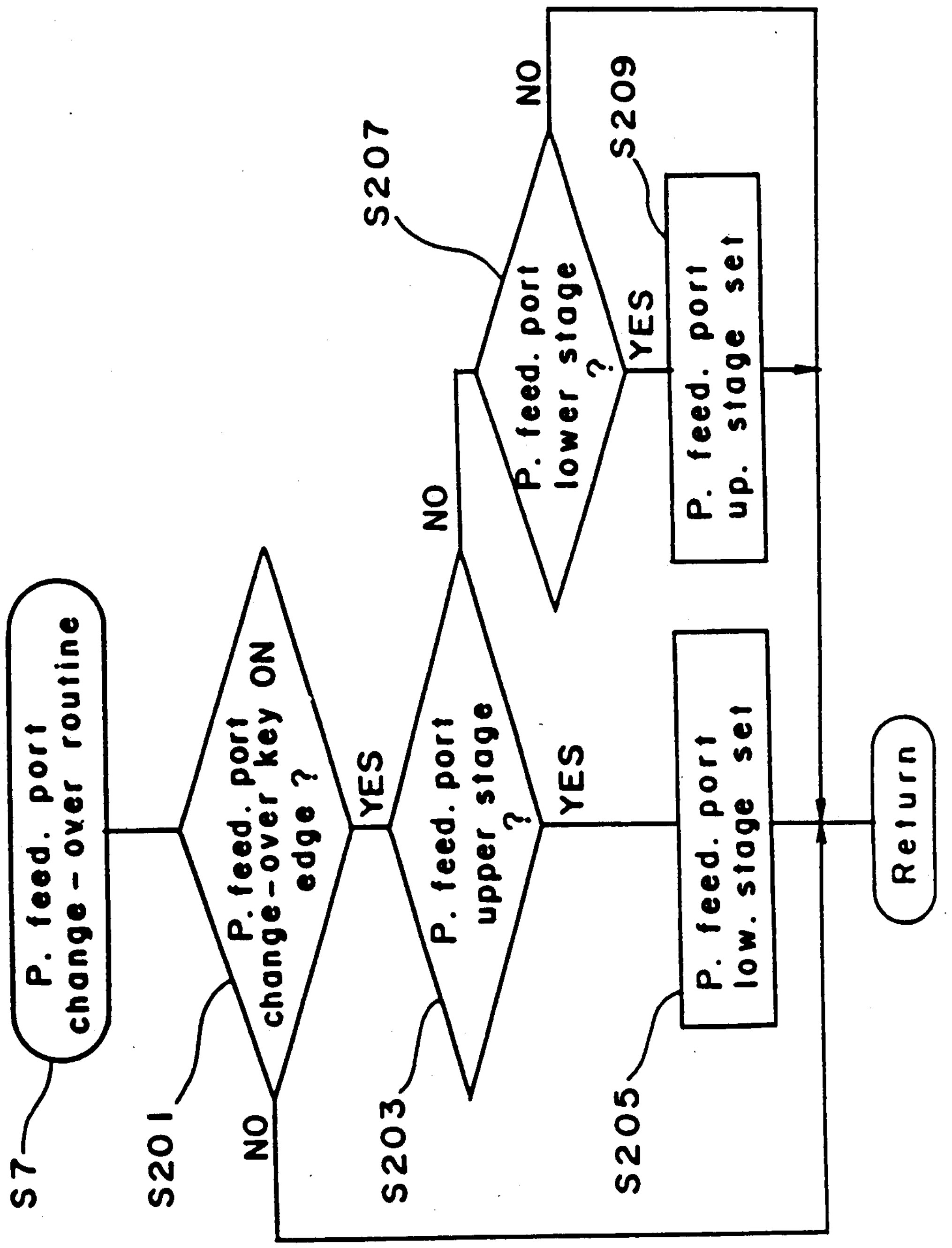
FIG. 7 is a flow-chart showing the processing at Step S7 (paper feeding port change-over routine) in FIG. 5, FIGS. 8(A) to 8(H) are flow-charts showing processings at Step S9 (copy function routine) in FIG. 5.
Figure 8A:
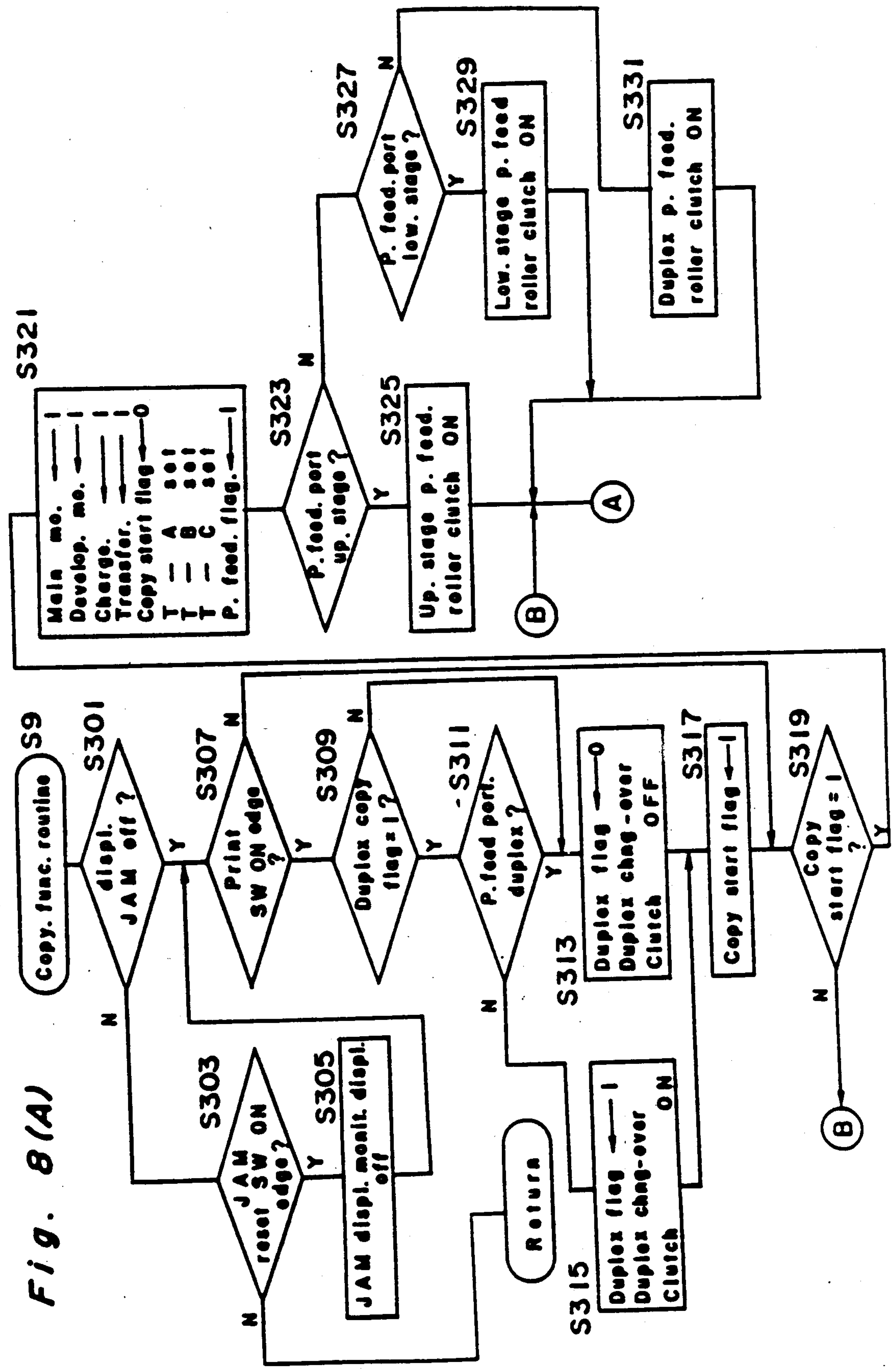
Figure 8B:
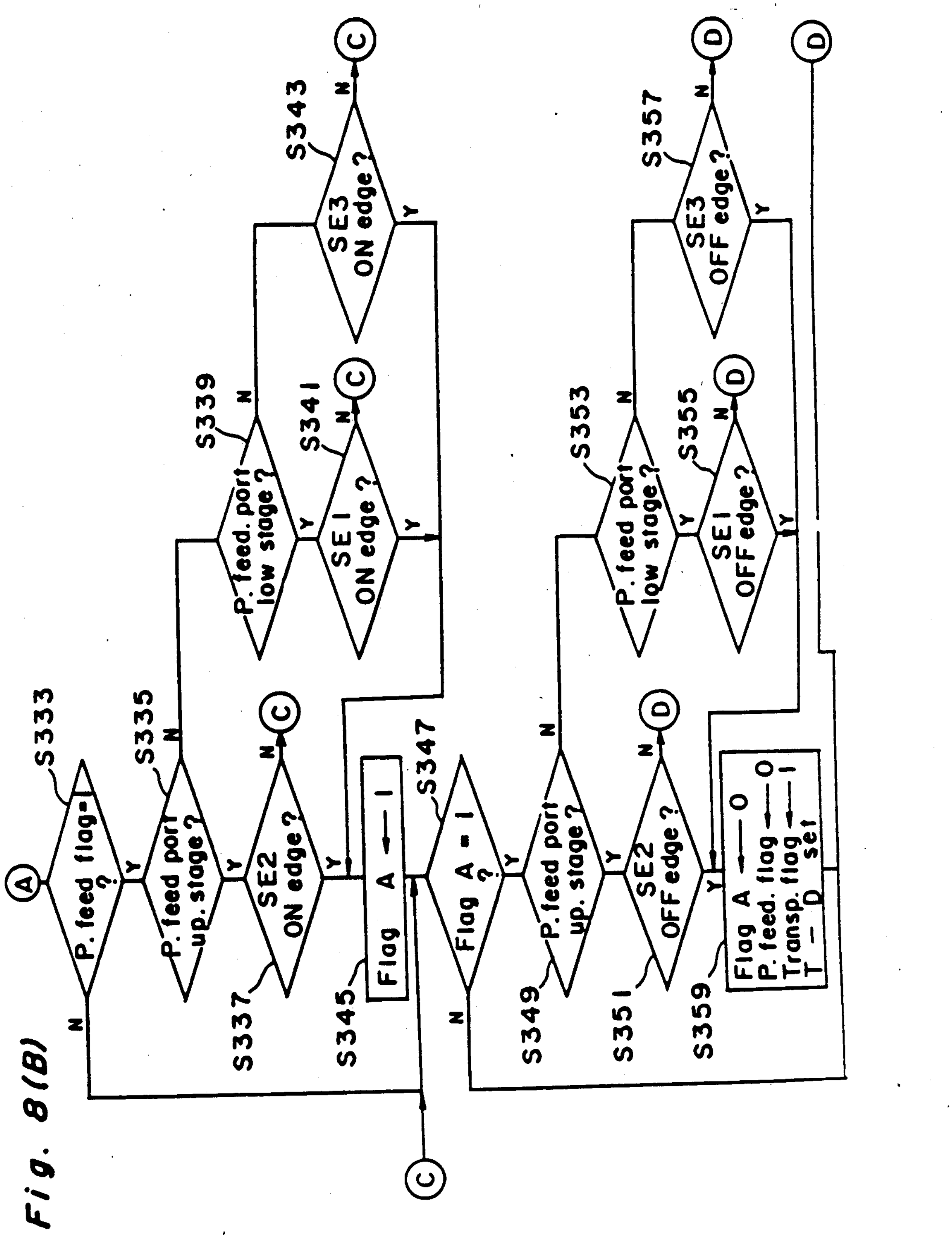
Figure 8C:
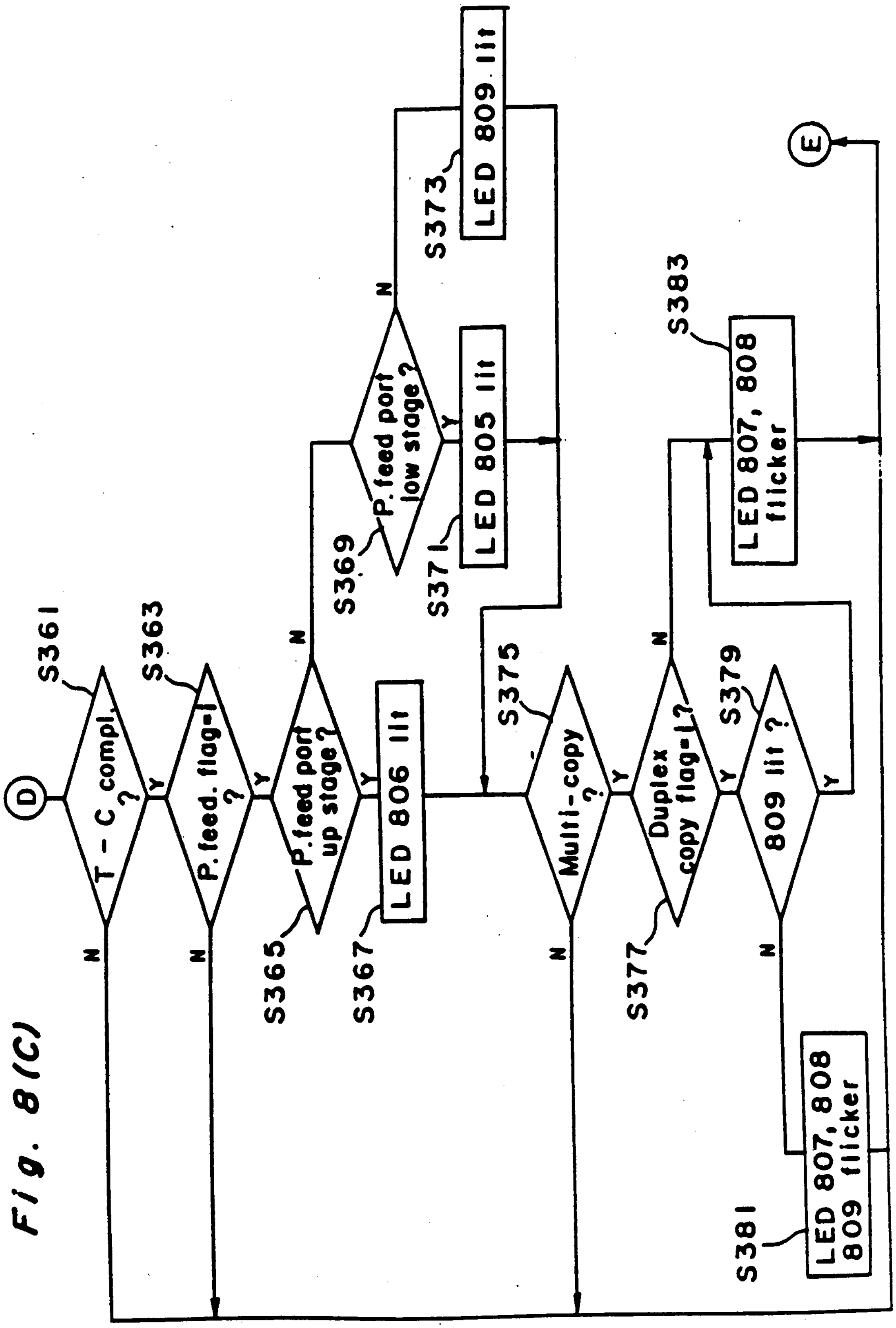
Figure 8D:
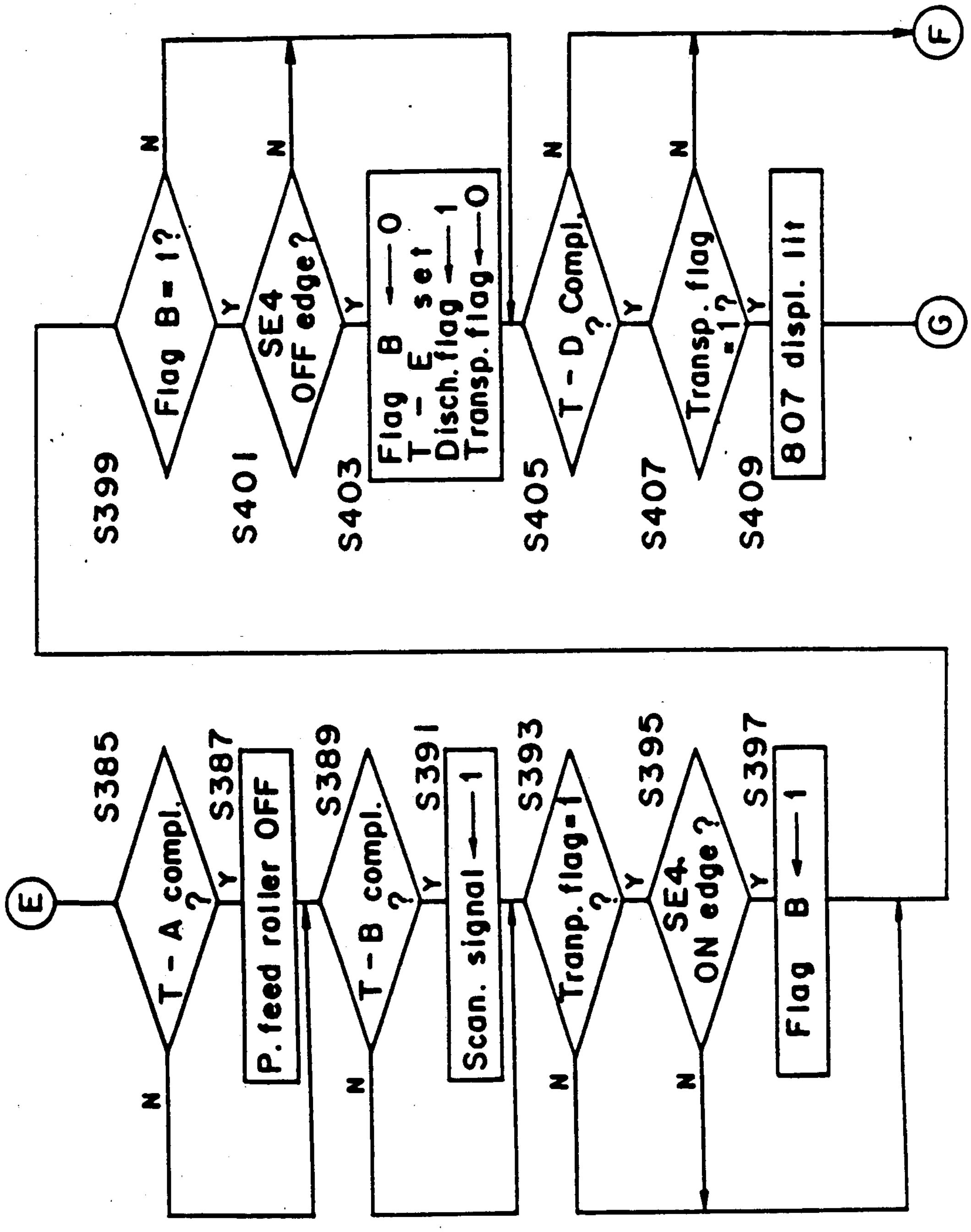
Figure 8E:
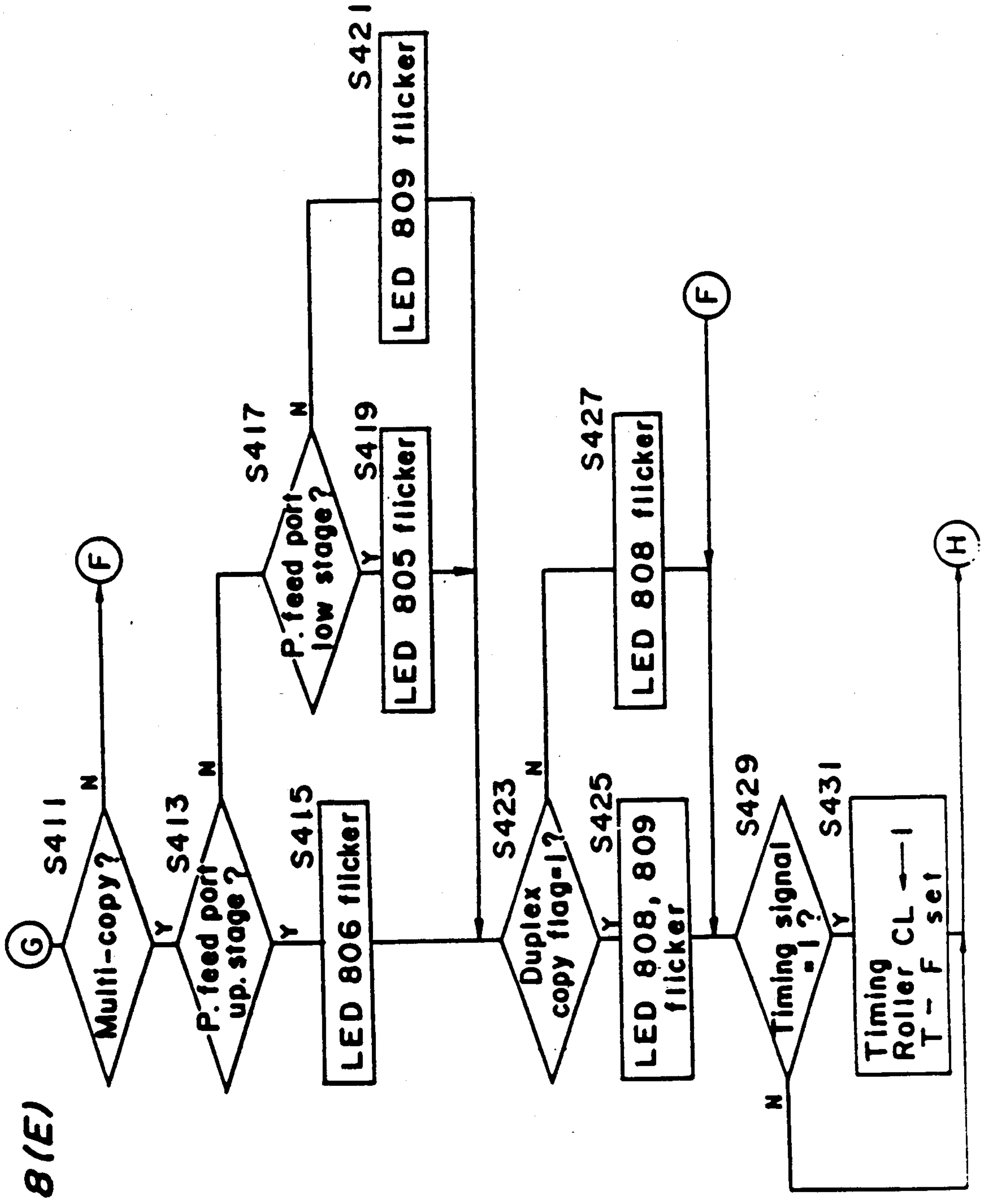
Figure 8F:
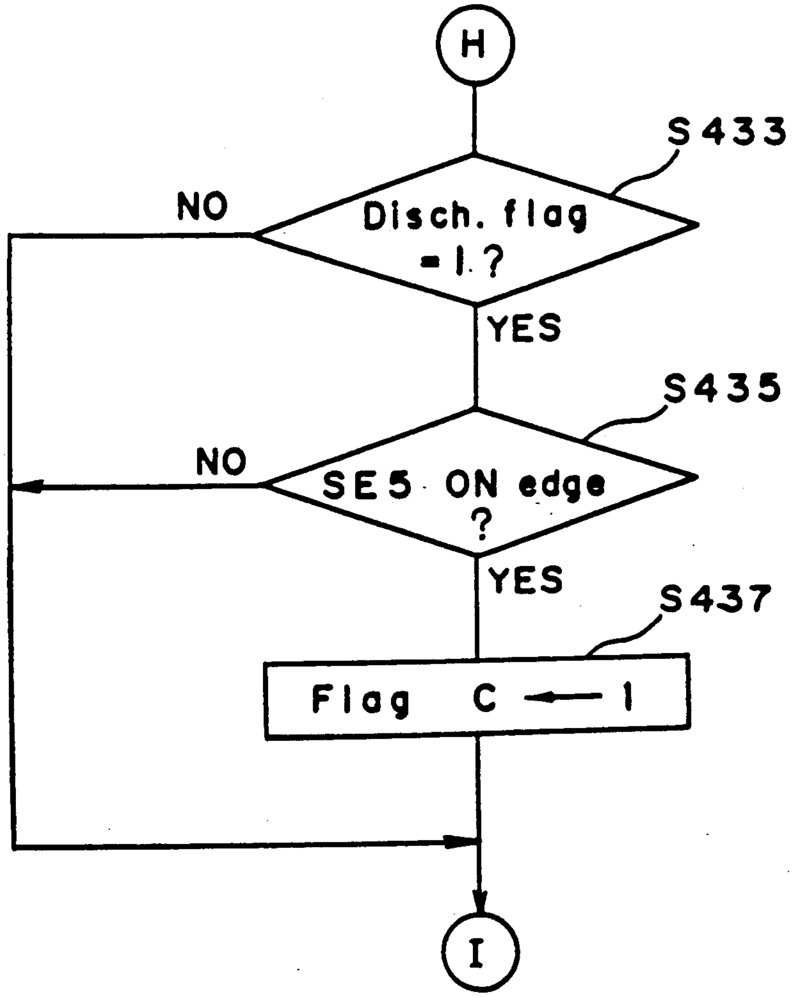
Figure 8G:
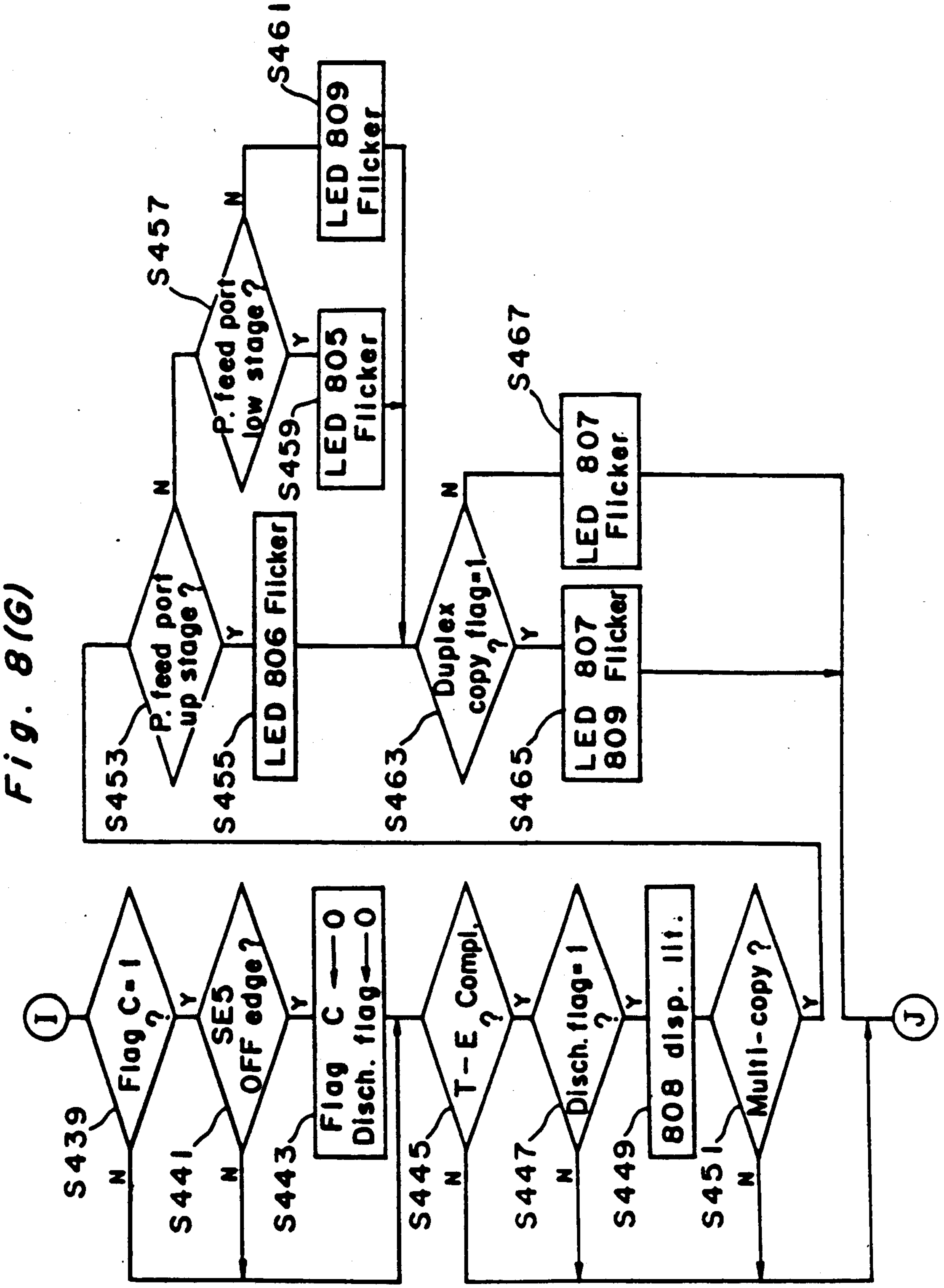
Figure 8H:
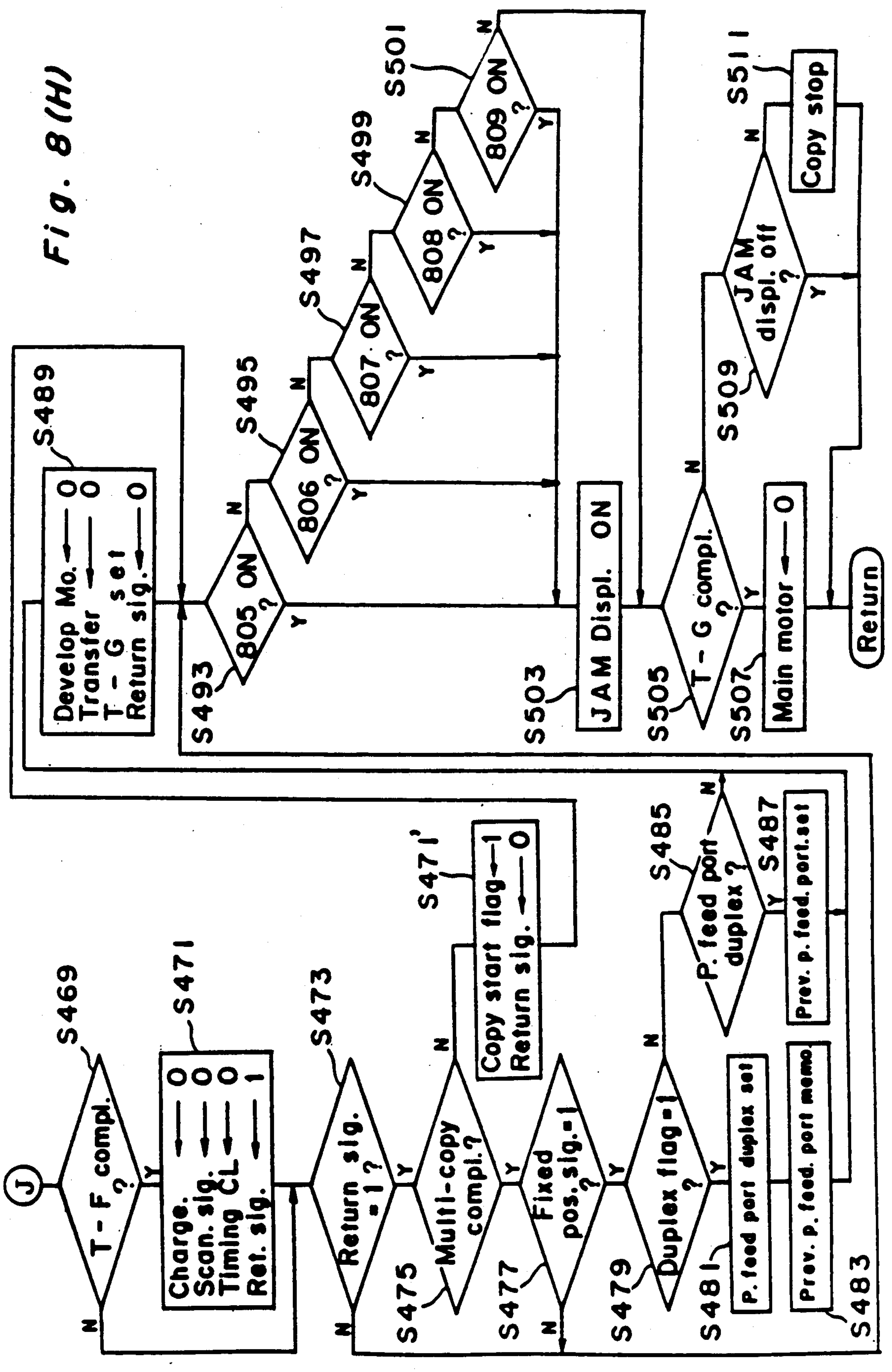

FIG. 7 is a flow-chart representing the processing at Step S7 referred to earlier.

In this sub-routine step, the paper feeding ports are changed-over between the upper stage tray 42 and the lower stage tray 43, corresponding to the detection of the ON edge of the paper feeding port change-over key 742 (Step S201; YES).

More specifically, when the paper feeding port for the upper stage paper feeding tray 42 has been selected (Step S203; YES), the paper feeding port for the lower stage paper feeding tray 43 is set (Step S205), while, in the case where the paper feeding port for the lower stage paper feeding tray 43 has been selected (Step S207; YES), the paper feeding port for the upper stage paper feeding tray 42 is set (Step S209).

As described above, change-over of the paper feeding ports is executed according to the ON edge of the paper feeding port change-over key 742.

(3) Copy function routine

FIGS. 8(A) to 8(H) are flow-charts showing processings at Step S9 referred to earlier.

(i) Steps S301 to S305 relate to processings after completion of the treatment for the jamming.

More specifically, in the case where the JAM display LED 735 is lit (Step S301; NO), depression of the JAM reset key 731 is waited for, and upon detection of the ON edge of said JAM reset key 731 (Step S303; YES), the JAM display LED 735 and the monitor display shown in FIG. 3 are turned off (Step S305).

(ii) Steps S307 to S317 relate to processings upon input of the copy start key 721.

More specifically, upon detection of the ON edge of the copy start key 721 (Step S307), the procedure advances to Step S309 for judgement of the duplex copy flag.

As a result, in the case where the duplex copy flag has been set, i.e. when the duplex copy mode has been set (Step S309; YES), the procedure advances to Step S311 so as to judge whether or not the feeding of the copy paper sheets during the copy processing is effected from the paper re-feeding unit 103 (Step S311).

As a result of the above judgement, if the paper feeding is not from the paper re-feeding unit 103, i.e. in the case where the copy processing is that onto the first surface of the copy paper sheet (Step S311; NO), the duplex flag is set to 1, while after turning ON the duplex changeover clutch for allowing accommodation into the paper re-feeding unit (Step S315), 1 is set for the copy start flag (Step S317).

On the other hand, as a result of a judgement at Step S311, when the paper feeding is effected from the paper re-feeding unit 103, i.e. the copy processing is for the second surface of the copy paper sheet (Step S311; YES), 0 is set for the duplex flag, with the duplex change-over clutch turned OFF (Step S313), and thereafter, 1 is set for the copy start flag (Step S317).

Meanwhile, in the case where the duplex copy flag is not set at Step S309, i.e. when it is judged that the duplex copy mode has been released (Step S309; NO), the procedure immediately proceeds to Step S313, and 0 is set for the duplex flag, with the duplex change-over clutch turned OFF (Step S313). Thereafter, 1 is set on the copy start flag (Step S317).

(iii) Steps S319 to S331 relate to processings to be executed during setting of the copy start flag.

More specifically, when the copy start flag is set (Step S319; YES), the main motor, developing motor, corona charger, and transfer charger are turned ON, while the copy start flag is lowered, with the timers A, B, and C being started. Moreover, 1 is set on the paper feeding flag 1 showing that the paper feeding function is being processed (Step S321).

Furthermore, any of the paper feeding clutches for feeding the copy paper sheets from the selected paper feeding port, i.e. the upper stage paper feeding clutch when the upper stage paper feeding port has been selected (Step S323; YES), the lower stage paper feeding clutch when the lower stage paper feeding port has been selected (Step S327; YES), or the duplex paper feeding clutch when the paper feeding is effected from the duplex unit 103 (Step S327; NO), is turned ON (Steps S321/S329/S331) to start the feeding function of the copy paper sheets.

(iv) Steps S333 to S383 relate to processings for monitoring occurrence of jamming at the paper feeding ports, etc.

In the first place, during processing for the paper feeding function (Step S333; YES), when the ON edge of any of the sensors for detecting starting of the paper feeding function from the selected paper feeding ports, i.e. the upper stage paper feeding sensor SE2 when the upper stage paper feeding port has been selected (Step S335; YES), the lower stage paper feeding sensor SE1 when the lower stage paper feeding port has been selected (Step S339; YES), or the paper re-feeding port sensor SE3 when the paper feeding is effected from the duplex unit 103 (Step S339; NO), is detected (Steps S337; YES/S341; YES/S343;YES), 1 is set on the flag A(Step S345). The flag A is for protection against erroneous function due to noises, etc.

Thereafter, in the state where 1 is set on the flag A (Step S347;YES), when the copy paper sheet has passed through the selected paper feeding port, i.e. if the OFF edge of any of the upper stage paper feeding sensor SE2 when the upper stage paper feeding port has been selected (Step S349;YES), the lower stage paper feeding sensor SE1 when the lower stage paper feeding port has been selected (Step S353;YES), or the paper re-feeding port sensor SE3 when the paper feeding is effected from the duplex unit 103 (Step S353;NO), is detected (Steps S351;YES/355;YES/357;YES), the flag A and the paper feeding flag are reset to 0, while 1 is set on the transport flag showing that the transport function of the copy paper sheets is being effected, with a timer D started (Step S359).

Figure 9:
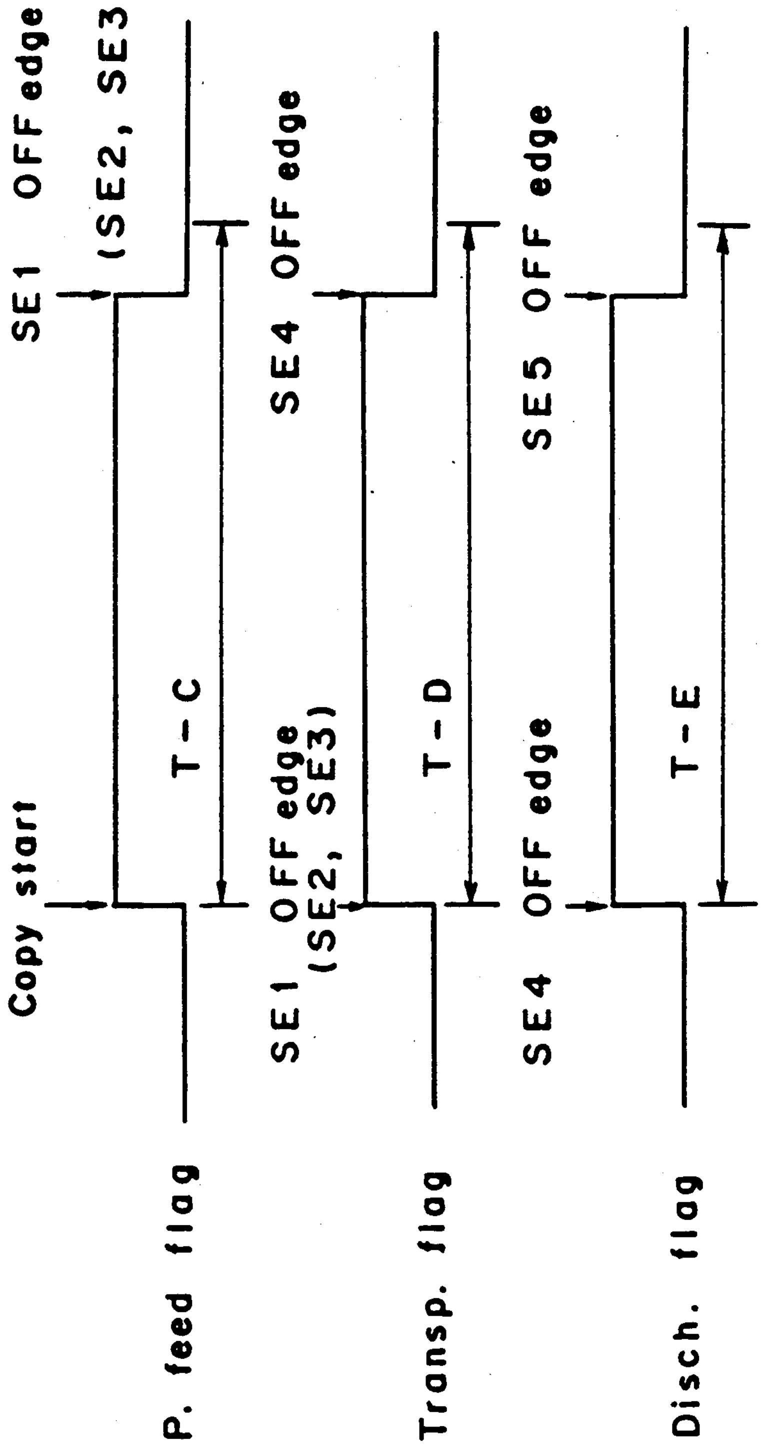
FIG. 9 is a time-chart for explaining the relation between flags and timers used in the flow-charts referred to above.

On the other hand, in the case where the paper feeding function has not yet been completed (Step S363;YES) upon completion of a timer C (FIG. 9) set for a sufficient time period to finish feeding of the copy paper sheet, it is judged that the jamming has taken place at the paper feeding port, and the JAM monitor display (FIG. 3) corresponding to the selected paper feeding port is illuminated.

More specifically, any of the paper feeding section trouble display LED 806 for the upper stage paper feeding port when the upper stage paper feeding port has been selected (Step S365;YES), the paper feeding section trouble display LED 805 for the lower stage paper feeding port when the lower stage paper feeding port has been selected (Step S369;YES), or the paper feeding section trouble display LED 809 for the duplex paper feeding port when the paper feeding from the duplex unit 103 has been selected, is illuminated. (Steps S367/S371/S373).

Furthermore, in the case where the multi-copy mode in which the copy paper sheets are continuously fed with respect to the same original document, has been set (Step S375;YES), since there is a possibility that the copy paper sheet remains in the paper transport passage other than that for the paper feeding section where the jamming has taken place, the paper transport passages being used are displayed for the operator.

More specifically, during one side face copy mode (Step S377; NO), the transport section trouble display LED 807 and the discharge section trouble display LED 808 are caused to flicker (Step S383).

Meanwhile, during the duplex copy mode (Step S377;YES), when the paper jamming at the duplex paper feeding port has taken place (Step S379;YES), the transport section trouble display LED 807 and the discharge section trouble display LED 808 are subjected to flickering (Step S383).

On the other hand, during the duplex copy mode (Step S377;YES), when the paper jamming has occurred at the upper stage paper feeding port or the lower stage paper feeding port (Step S379;NO), the transport section trouble display LED 807, the discharge section trouble display LED 808, and the paper feeding section trouble display LED 809 for the duplex paper feeding port are lit (Step S381).

(v) Steps S385 to S391 relate to processings for effecting timing control of the copying process.

Specifically, at the completion timing of the timer A (Step S385;YES), the clutch for the paper feeding roller of the selected paper feeding port is turned OFF (Step S387), and the scanning signal is turned ON(Step S391) at the completion timing of the timer B (Step S389;YES) for transmission to the CPU which controls the optical system 101, whereby the exposure scanning is started at the optical system 101.

(vi) Steps S393 to S427 relate to processings for monitoring, etc. of occurrence of jamming at the transport section.

Firstly, during the transport function processing (Step S393;YES), when the ON edge of the sensor SE4 for detecting the copy paper sheet immediately before the set of the timing rollers 13, is detected (Step S395;YES), 1 is set on the flag B (Step S397). The flag B is for protecting against erroneous functions due to noises, etc. similarly to the flag A.

Thereafter, in the state where 1 is set on the flag B (Step S399;YES), when the copy paper sheet has passed through the position of the sensor SE4 (Step S401;YES), the flag B and transport flag are reset to 0, while 1 is set on the discharge flag which shows the discharge processing of the copy paper sheet is under way, with a timer E being started (Step S403).

Meanwhile, upon completion of the timer D (FIG. 9) which has been set for the time period sufficient to complete transportation of the copy paper sheet (Step S405;YES), if the transport function has not yet been finished (Step S407;YES), it is judged that the jamming has taken place at the transport section, and the transport section trouble display LED 807 for the jam monitor display (FIG. 3) is lit (Step S409).

Furthermore, in the case where the multi-copy mode has been set (Step S411;YES), there is a possibility that the copy paper sheet remains in the paper transport passage other than that for the transport section where the jamming has taken place, and therefore, the paper transport passage being used is indicated to the operator.

More specifically, in the first places, any of the paper feeding section trouble display LED 806 for the upper stage paper feeding port when the upper stage paper feeding port has been selected (Step S413;YES), the paper feeding section trouble display LED 805 for the lower stage paper feeding port when the lower stage paper feeding port has been selected (Step S417;YES), or the paper feeding section trouble display LED 809 for the duplex paper feeding port when the paper feeding from the duplex unit 103 has been selected (S417;NO), is caused to flicker (Steps S415/S419/S421).

Moreover, during one side face copy mode (Step S423;NO), the discharge section trouble display LED 808 is caused to flicker (Step S427).

Meanwhile, during the duplex copy mode (Step S423;YES), the paper feeding section trouble display LED 809 for the duplex paper feeding port and the discharge section trouble display LED 808 are subjected to flickering (Step S425).

(vii) Steps S429 to S431 are processings for effecting timing control of the copying process.

Upon receipt of the timing signal from the optical system 101 (Step S429;YES), the clutch for the set of timing rollers 13 is turned ON, with the timer F being set (Step S431).

(viii) Steps S433 to S467 relate to processings for monitoring, etc. of occurrence of jamming at the discharge section.

Firstly, during the discharge function processing (Step S433;YES), when the ON edge of the sensor SE5 disposed immediately before the set of the discharge rollers 15, is detected (Step S435;YES), 1 is set on the flag C (Step S437). The flag C is for protection against erroneous functions due to noises, etc. similarly to the flags A and B.

Thereafter, in the state where 1 is set on the flag C (Step S439;YES), when the copy paper sheet has passed through the position of the sensor SE5 (Step S441;YES), the flag C and discharge flag are reset to 0 (Step S443).

Meanwhile, upon completion of the timer E (FIG. 9) which has been set for the time period sufficient to complete discharge of the copy paper sheet (Step S445;YES), if the discharge function has not yet been finished (Step S 447;YES), it is judged that the jamming has taken place at the discharge section, and the discharge section trouble display LED 808 for the jam monitor display (FIG. 3) is lit (Step S449).

Furthermore, in the case where the multi-copy mode has been set (Step S451;YES), there is a possibility that the copy paper sheet remains in the paper transport passage other than that for the discharge section where the jamming has taken place, and therefore, the paper transport passage being used is indicated to the operator.

More specifically, in the first place, any of the paper feeding section trouble display LED 806 for the upper stage paper feeding port when the upper stage paper feeding port has been selected (Step S453;YES), the paper feeding section trouble display LED 805 for the lower stage paper feeding port when the lower stage paper feeding port has been selected (Step S457;YES), or the paper feeding section trouble display LED 809 for the duplex paper feeding port when the paper feeding from the duplex unit 103 has been selected (Step S457;NO), is caused to flicker. (Steps S455/S459/S461).

Moreover, during one side face copy mode (Step S463;NO), the transport section trouble display LED 807 is caused to flicker (Step S467).

Meanwhile, during the duplex copy mode (Step S463;YES), the paper feeding section trouble display LED 809 for the duplex paper feeding port and the transport section trouble display LED 807 are subjected to flickering (Step S465).

(ix) Steps S469 to S489 are steps for effecting timing control for the copying process.

Specifically, at the completion timing of the timer F referred to earlier (Step S469;YES), the corona charger, scanning signal and clutch for the set of timing rollers 13 are turned OFF, while the return signal for controlling returning of the scanner back to the home position is turned ON (Step S471).

Furthermore, at the start timing of the returning function of the scanning member for the optical system (Step S473;YES), it is judged whether or not the multi-copy for the set number of sheets has been entirely completed (Step S475).

As a result, if it is found that the copying function for the set number of sheets has not been completed (Step S475;NO), the copy start flag is set to continue the copying function with respect to the same original document, with the return signal turned OFF (Step S471').

On the other hand, in the case where it is judge that the copying function for the set number of sheets has been completed at Step S475 (Step S475;YES), the change-over treatment of the paper feeding ports during the duplex copy mode is effected at the receiving timing of the fixed position signal from the optical system 101 (Step S477;YES).

More specifically, when the duplex flag is set to 1 (Step S479;YES), it is the case where the copy function was effected with respect to the first side face of the copy paper sheet, and therefore, the duplex paper feeding port of the paper re-feeding unit 103 is set as the paper feeding port for the next copying function (Step S481), and the paper feeding port which has been selected up to that time is memorized as the previous paper feeding port (Step S483).

Meanwhile, when the duplex paper feeding port of the paper re-feeding unit 103 has been selected (S485;YES) in the case where the duplex flag is not set (S479;NO), it is the case where the copying function is effected with respect to the second side face of the copy paper sheet, and therefore, the paper feeding port memorized as the previous paper feeding port is set as the paper feeding port for the subsequent copying function (Step S487).

Thereafter, the developing motor and the transfer charger are turned OFF, with the return signal being also set OFF, while a timer G is started (Step S489).

(x) Steps S493 to S503 relate to processings for the jam display treatment.

Specifically, respective trouble display LED's for the monitor display sections during occurrence of the jamming are checked (Steps S493/S495/S497/S499/S501), and if even one of them is lit, the JAM display LED 735 is lit (Step S503).

(xi) Steps S505 to S511 are steps for treating completion of the copying function control.

Specifically, at the completion timing of the timer G (Step S505;YES), the main motor is turned OFF (Step S507).

Meanwhile, in the case where the JAM display LED 735 is lit (Step S509;YES), the copying function is suspended (Step S511).

The control of the copying apparatus according to the present invention is effected in the manner as described so far.

Modification to the foregoing embodiment, etc.

In the foregoing embodiment, the duplex copy mode and the selecting mode of the paper feeding ports are raised by way of examples as the modes related to the selection of the paper transport passages of he copy paper sheets.

It should be noted here, however, that the present invention is not limited in its application to such modes alone, but may be readily applied to all modes related to selection of paper transport passages for the copy paper sheets.

For example, copying of the first side face of the first sheet of the multi-copy during the duplex mode, and copying of the second side face of the last sheet of the multi-copy similarly during the duplex mode, are common to each other from the viewpoint of the duplex copy mode, but the paper transport passages employed (selected) are respectively different from each other.

Accordingly, the case as referred to above may be differentiated to apply the concept of the present invention.

It should also be noted here that, in the foregoing embodiment, although the display element for indicating the copy paper transport trouble occurring position is arranged to be lit, with the display element indicating the selected copy paper transport passage being adapted to flicker for distinction between the copy paper transport trouble occurring position (such as jam or the like) and the selected copy paper transport passage, the arrangement may be so modified, for example, as to change color of the display element indicating the copy paper transport trouble occurring position, from that of the display element representing the selected copy paper transport passage.

As is clear from the foregoing description, according to the present invention, the copying apparatus arranged to effect copying function through selection of transport passages of copy paper sheets according to copying modes, is provided with the trouble detecting means for detecting the position where trouble for transport of the copy paper sheet has taken place, and the display means for displaying the position at which the copy paper sheet transport trouble has taken place and also, the copy paper sheet transport passage which has been selected at the time when the trouble takes place respectively, through distinguishment therebetween.

As stated in the foregoing embodiment, according to the present invention, the position at which the trouble such as jamming or the like has taken place and the paper transport passage as selected are displayed through distinguishment therebetween. Meanwhile, the paper transport passages not selected are not displayed.

In other words, by the arrangement of the present invention, the operator can obtain such information that "the copy paper sheet remains without fail at the position where the trouble has taken place", "in the paper transport passage as selected, there is a possibility that the copy paper sheet remains" and "there is no possibility of presence of remaining copy paper sheet in the paper transport passage not selected".

Accordingly, for the removal of the copy paper sheet remaining within the copying apparatus, the operator may obtain quick access to the position where such remaining copy paper sheet is present, and thus, there is no possibility that the remaining copy paper sheet is left unremoved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An image forming apparatus provided with a plurality of copying modes and a plurality of copy paper transport passages to be selected according to the copying modes, which comprises:

- means for selecting a desired copying mode from said plurality of copying modes;
- means for setting a copy paper transport passage to be used for the selected copying mode, from said plurality of paper transport passages;
- a detecting means disposed in said plurality of copy paper transport passages for detecting trouble during transport of copy paper;
- a display means for indicating a position in the copy paper transport passage where the trouble for transporting the copy paper has occurred and for indicating the selected paper transport passage, said display means including a plurality of common display elements; and
- a control means for actuating some of said plurality of common display elements for indicating both the position where the copy paper transport passage has occurred and said set copy paper transport passage in response to the detection of said copy paper transport trouble.

2. An image forming apparatus as claimed in claim 1, wherein said control means is arranged to selectively alter a state of illumination of the display element for indicating said set copy paper transport passage from a state of illumination of the display element for indicating the position where the copy paper transport trouble has occurred in order to visually differentiate between said set copy paper transport passage and said copy paper transport trouble occurring position.

3. An image forming apparatus as claimed in claim 2, wherein said control means is arranged to cause said display element for indicating the copy paper transport trouble occurring position to be lit, and said display element for indicating said set copy paper transport passage to periodically flicker.

4. An image forming apparatus as claimed in claim 1, wherein said control means is arranged to illuminate said display element for indicating said copy paper transport trouble occurring position and said display element for indicating said set copy paper transport passage upon detection of said copy paper transport trouble in a multi-copying, and to illuminate said display element for indicating the copy paper transport trouble occurring position upon detecting of said copy paper transport trouble in a single-copying.

5. An image forming apparatus as claimed in claim 1, wherein said copying modes include a paper feeding section selecting mode and a duplex copying mode.

6. An image forming apparatus provided with a plurality of copying modes, which comprises:

- means for setting a copy paper transport passage to be used for the selected copying mode from a plurality of copy paper transport passages;
- a display means including a plurality of common display elements which form the copy paper transport passages as they are in the form of the display elements and which also indicate a transport trouble location, and
- a control means connected to said display means and arranged to selectively illuminate some of said common display elements for indicating said set copy paper transport passage and for indicating the transport trouble location.

7. An image forming apparatus as claimed in claim 6, further including detecting means for detecting occurrence of the copy paper transport trouble within said copy paper transport passage, said control means being arranged to selectively illuminate some of said plurality of display elements upon detection of said copy paper transport trouble.

8. An image forming apparatus as claimed in claim 7, wherein said control means is arranged to selectively illuminate some of said plurality of display elements in a multi-copying.

9. In an image forming apparatus having a plurality of copy paper transport passages, a display for displaying information with respect to states of said image forming apparatus, which comprises:

means for displaying occurrence of trouble within the image forming apparatus, said trouble including copy paper jamming along said plurality of copy paper transport passages; and a monitor display means for indicating position of the trouble within said copy paper transport passages and for indicating a selected paper transport passage, said monitor display means including a plurality of common display elements, which form said plurality of copy paper transport passages; some of said plurality of common display elements being used to indicate at least one of said plurality of copy paper transport passages, with at least one of the some of said common display elements also being used for indicating said position of the trouble.

10. A display as claimed in claim 9, further including a control means for selectively altering a state of illumination of the display element for indicating the at least one copy paper transport passage from a state of illumination of said display element for indicating the position of the trouble, in order to visually differentiate between said at least one copy paper transport passage and said position of the trouble.

11. A display as claimed in claim 10, wherein said control means is arranged to cause the display element for said at least one copy paper transport passage, to periodically flicker, and the display element for said position of the trouble to be continuously lit.

* * * * *